United States Patent [19]

Cyriax

[11] Patent Number: 4,552,384
[45] Date of Patent: Nov. 12, 1985

[54] MOLDED-JOINT ASSEMBLY

[75] Inventor: Wilhelm Cyriax, Meinerzhagen, Fed. Rep. of Germany

[73] Assignee: Battenfeld Maschinenfabriken GmbH, Meinerzhagen, Fed. Rep. of Germany

[21] Appl. No.: 475,848

[22] Filed: Mar. 16, 1983

Related U.S. Application Data

[60] Division of Ser. No. 269,820, Jun. 3, 1981, Pat. No. 4,410,479, which is a continuation-in-part of Ser. No. 84,196, Oct. 12, 1979, abandoned.

[30] Foreign Application Priority Data

Oct. 18, 1978 [DE] Fed. Rep. of Germany ....... 2845308
Sep. 6, 1979 [DE] Fed. Rep. of Germany ....... 2936016

[51] Int. Cl.⁴ .................................... F16L 17/02
[52] U.S. Cl. .................... 285/111; 285/291; 285/297; 285/373'
[58] Field of Search .............. 285/291, 294, 297, 110, 285/111, 373

[56] References Cited

U.S. PATENT DOCUMENTS

| 3,690,701 | 9/1972 | Gramain | 285/111 |
| 3,960,394 | 6/1976 | Hubner et al. | 285/297 |
| 4,173,362 | 11/1979 | Glover et al. | 285/110 |

FOREIGN PATENT DOCUMENTS

| 6148173 | of 0000 | Austria . | |
| 500297 | 12/1975 | Austria . | |
| 502491 | 7/1976 | Austria . | |
| 493308 | 3/1977 | Austria . | |
| 509881 | 4/1977 | Austria . | |
| 1902520 | 8/1970 | Fed. Rep. of Germany | 285/297 |
| 7221985 | 6/1971 | Fed. Rep. of Germany . | |
| 2416936 | 10/1975 | Fed. Rep. of Germany . | |
| 7407979 | 11/1975 | Fed. Rep. of Germany | 285/111 |
| 2804645 | 8/1978 | Fed. Rep. of Germany . | |
| 2845308 | 1/1980 | Fed. Rep. of Germany . | |
| 1412263 | 10/1975 | United Kingdom . | |
| 1477074 | 6/1977 | United Kingdom . | |
| 1510013 | 5/1978 | United Kingdom . | |
| 1546769 | 5/1979 | United Kingdom . | |

Primary Examiner—Dave W. Arola
Attorney, Agent, or Firm—Karl F. Ross; Herbert Dubno

[57] ABSTRACT

A hard outer member generally centered on an axis and having a concave inner surface is injection molded of a relatively hard synthetic resin to have on its inner surface at one end a recess formed with a radially throughgoing passage. Parts of the mold in which this member is molded are then displaced before the resin has time to cure and another softer synthetic resin injected through this radially throughgoing passage to form in the recess a relatively soft seal having a sprue extending through the passage. The seal therefore adheres in surface contact with the inner surface at the recess and the sprue further ensures excellent holding of the seal on the member.

2 Claims, 11 Drawing Figures

MOLDED-JOINT ASSEMBLY

CROSS-REFERENCE TO RELATED APPLICATION

This application is a division of Ser. No. 269,820 filed June 3, 1981 (now U.S. Pat. No. 4,410,479 of Oct. 18, 1983), application Ser. No. 269,820 being a continuation-in-part of Ser. No. 084,196 filed Oct. 12 1979, now abandoned.

FIELD OF THE INVENTION

The present invention relates to a molded joint. More particularly this invention concerns the type of joint used in bell-and-spigot pipe, prefabricated synthetic-resin gutter and drainage channels, and the like.

BACKGROUND OF THE INVENTION

It is known from U.S. Pat. No. 4,173,362 to form a pipe joint in a complex mold by first molding a pair of seal rings on a mold core, then by displacing outer mold parts to allow molding of a pipe part around the two seal rings. At the interface between the seal rings and pipe part there will normally be a good bond which will ensure that the pieces remain virtually integral. After some curing the core parts are pulled out of the assembly with appropriate deformation of the fairly soft elastomeric seal rings.

Such an arrangement does indeed form an excellent joint assembly. Nonetheless it is essential that the thus formed joint be in at least one axial direction of sufficiently large diameter that the core parts can be extracted. Furthermore as the core parts are extracted with deformation of the seal rings, it is essential to wait until the seal rings are fully cured; otherwise withdrawal of the core part will permanently deform the seal ring. Another disadvantage of this system is that the bond between the seal ring and the pipe releases, allowing the seal ring to slip out of the pipe.

OBJECTS OF THE INVENTION

It is therefore an object of the present invention to provide an improved seal assembly.

Another object is the provision of such a seal assembly wherein the core part of the mold can be withdrawn immediately after formation of the assembly without fear of permanent deformation of any parts of the assembly.

Yet another object is to provide such a seal assembly where, even if the interface bond between the seal ring and the part carrying it releases, the seal ring will remain mechanically well secured in the part.

SUMMARY OF THE INVENTION

These objects are attained according to the instant invention in a method of making a joint assembly having a concave outer element centered generally on an axis, formed with a radially throughgoing passage, and provided internally with a relatively soft seal having a sprue in the passage. The method employs a mold having an inner mold part having sections displaceable between a first position wherein their outer surface is complementary to the inner surface of the assembly at the concave outer element and a second position wherein their outer surface is complementary to the inner surface of the seal ring, at least one radially displaceable rod part movable between an inner position engaging the inner mold part and extending radially therefrom and an outer position clear of the inner mold part, and an outer mold part having an inner surface complementary to the external surface of the assembly at the concave outer element. The method according to this invention comprises the steps of first injection molding a relatively hard member in the mold in the first and inner positions of the parts thereof so that the member has at one end the concave element formed with the radially throughgoing passage, and thereafter injecting a hardenable material through the passage in the second and outer positions of the parts of the mold and curing the hardenable material to form the relatively soft seal ring in the outer element with a sprue in the passage.

Thus with the system according to the instant invention a concave hard element, which can be a tubular piece of pipe or a gutter channel section, is provided with a soft seal ring that is effectively secured mechanically to it by means of the sprue or sprues, so that even if the interface bond between the outer surface of the seal ring and the inner surface of the member carrying it releases, the two will remain solidly fixed together. In addition it is possible to move the inner mold part out of the outer mold part without substantial deformation of the seal ring, and in many applications without any deformation of the seal ring whatsoever, so that it is possible to demold the product very rapidly, even before the resins cure fully.

When the system according to this invention is employed to make a bell-and-spigot pipe joint the inner surface of the bell is formed with a pair of stepped regions interconnected by a shoulder. The outer joint region, that is that region of the joint close to the end of the bell, is of larger diameter than the inner joint region. The seal is of Y-section, having a central leg lying on the inner region, one arm lying on the outer region, and another arm radially inward of the one arm and forming therewith an axially outwardly open groove. Such a seal ring has a relatively large surface for adherence or fusing to the inner wall of the bell, yet nonetheless has an extremely elastic lip formed by the other arm which can create a very tight seal with spigot end of another pipe fitted into this bell. This elasticity can be aided according to another feature of this invention by forming this lip constituted by the other arm of reduced radial thickness in the outward direction, that is toward the open spigot end. In such an arrangement the gap between the two arms, in the unstressed or unassembled condition of the pipe joint, is of regular cross-sectional or radial dimensions along its entire axial length.

It is also possible to use a tightening element in the form of a ring that is fitted over the spigot and jammed over the gap between the two arms of the seal on assembly of the joint in order to ensure an even tighter fit.

According to this invention the seal can be formed as a basically cylindrical tube having one end fitted in an axially outwardly and radially inwardly open groove at the end of the bell. The other end of the seal ring extends in the unassembled condition of the joint axially outwardly from the bell, but this end is turned inward to impart a U-section to the seal ring when a spigot is fitted into the bell. The surface of the outer portion of such a seal ring in the unassembled condition and the inner surface in the assembled condition is formed with sawtooth ridges whose short steep flanks are inward of the respective shallow long flanks so as to inhibit axial displacement of the spigot out of the bell.

SPECIFIC DESCRIPTION

Figure 1:
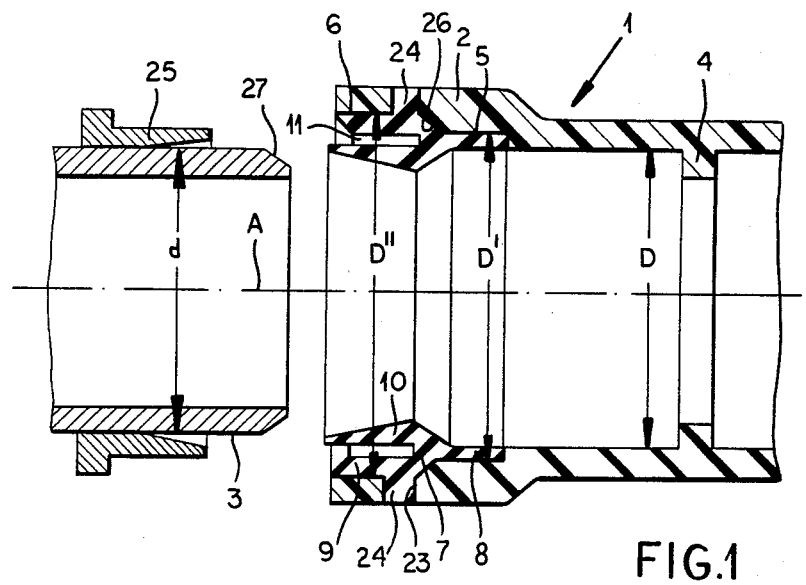
FIG. 1 is an axial section through a pipe joint according to the instant invention.

A pipe joint 1 as shown in FIG. 1 is constituted as a bell 2 formed at one end of a piece of pipe and a spigot 3 formed on the other end, the bell and spigot of two separate pieces of pipe being shown in FIG. 1. Both of these connecting formations are centered on an axis A. The bell end of the pipe is formed spaced axially inwardly from its open end with an abutment ridge 4 of square section. The pipe is generally of an internal diameter D, but is formed at the bell 2 with an inner region 5 of a greater diameter D' and an outer region 6 of an even greater diameter D'', these two regions being connected together by an inclined shoulder 26. The spigot end of the pipe has an outer diameter d which is slightly smaller than the inner diameter D. The pipe is formed of a rigid synthetic resin such a polyvinyl chloride.

A Y-section seal ring 7 has a central leg 8 lying in the region 5 and having an inner diameter equal to D, and a pair of arms 9 and 10, the former of which lies against the surface 6 and the latter of which is spaced inwardly therefrom and forms with the arm 9 an axially outwardly open groove or gap 11. The arm 10 is of outwardly tapering cross section, having a diameter at its outer edge which is approximately equal to the diameter d of the spigot 3. The end of this spigot 3 is formed with a bevel 27 to facilitate fitting together of the arrangement. Sprues 24 formed integrally with the seal 7 at the outer arm 9 thereof engage radially outwardly through passages 23 in the bell 2.

Figure 2:
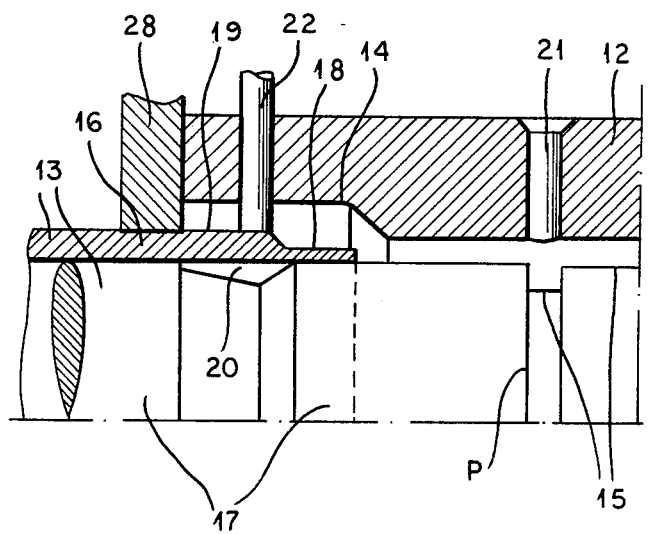
FIG. 2 is a section through the mold apparatus for making the pipe joint of FIG. 1 in a first production stage according to this invention.
Figure 3:
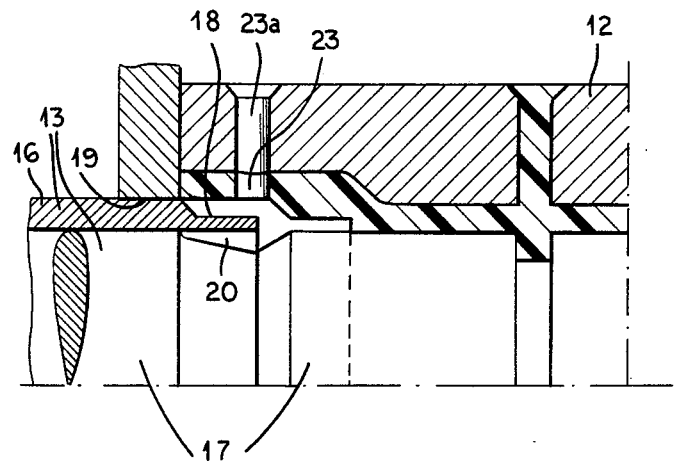
FIG. 3 is a section similar to that of FIG. 2 showing the following production stage.
Figure 4:
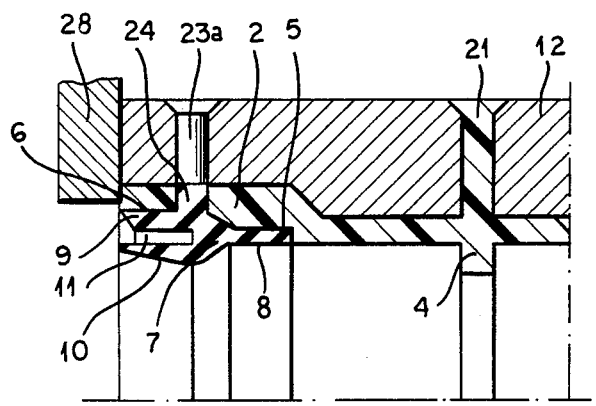
FIG. 4 is a section similar to that of FIG. 2 showing the last production stage.

The joint 1 described above is manufactured in accordance with the mold illustrated in FIGS. 2–4. This mold has an outer mold part 12 and an inner mold part 13. The inner part 13 is formed of a part 15 separable along a plane P, a part 17, and a part 16. The part 17 is formed with a groove 20 having a shape complementary to that of the inner surface of the arm 10. Otherwise this part 17 is of cylindrical shape of the diameter D. The part 15 has a stepped end so that it can form the abutment ridge 4. This part 15 is withdrawn at the end of the molding in one direction, to the right at FIG. 2, whereas the part 17 is withdrawn in the opposite direction. The part 16 of the inner mold part 13 is axially displaceable relative to the central part 17 of the inner part 13 and has an end 18 of a shape complementary to that of the groove 11.

The outer mold part 12 has a widened end region 14 of a shape complementary to that of the outside surface of the bell 2. In addition the mold comprises an end plate 28 which is formed as a two-part ring that tightly engages around the part 16 and that axially closes the space formed between the inner and outer mold parts 12 and 13.

Finally the mold includes a plurality of angularly equispaced and radially displaceable pins or rods 22 that fit through complementary holes 23a in the outer mold part 12. This mole part 12 also has at the level of the plane P between the two sub-parts 15 and 17 a plurality of fill openings 21.

The mold assembly according to the instant invention is moved into the position of FIG. 2 before molding commences. In this position the sleeve 16 is advanced to completely close off the groove 20 and the rods 22 are radially inwardly advanced to abut against the outer surface 19 of this sleeve 16. Then as can be seen by comparison of FIGS. 2 and 3 a synthetic resin is introduced through the holes 21 to fill the space left between the mold parts as shown in FIG. 2. Once this material has hardened somewhat the sleeve 16 is withdrawn to the position indicated in FIG. 3, that is only extending partially into the space at the groove 20, and the pins 22 are withdrawn to leave the passage 23 in the bell 2. Then as illustrated in FIG. 4 more resin is injected through the holes 23a to form the seal ring 7. Once this resin has been cured somewhat all of the inner mold parts 18, 15, and 16 are axially withdrawn from inside the thus formed bell 1 and the two halves of the ring 28 are radially withdrawn. The pipe can then be demolded axially, or the outer mold part 12 can split along an axial plane.

The result is a virtually integral formation of the seal ring 7 with the bell 2. The seal ring 7 is injection molded before the resin of the bell 2 has had a chance to harden completely, so that the two parts 7 and 2 adhere together extremely well. In fact the hot resin that forms the ring 7 normally will melt and fuse in part with the inner surfaces 5, 6 and 26 of the bell 2 to form an assembly that is integral at the interface between these two parts.

Figure 5:
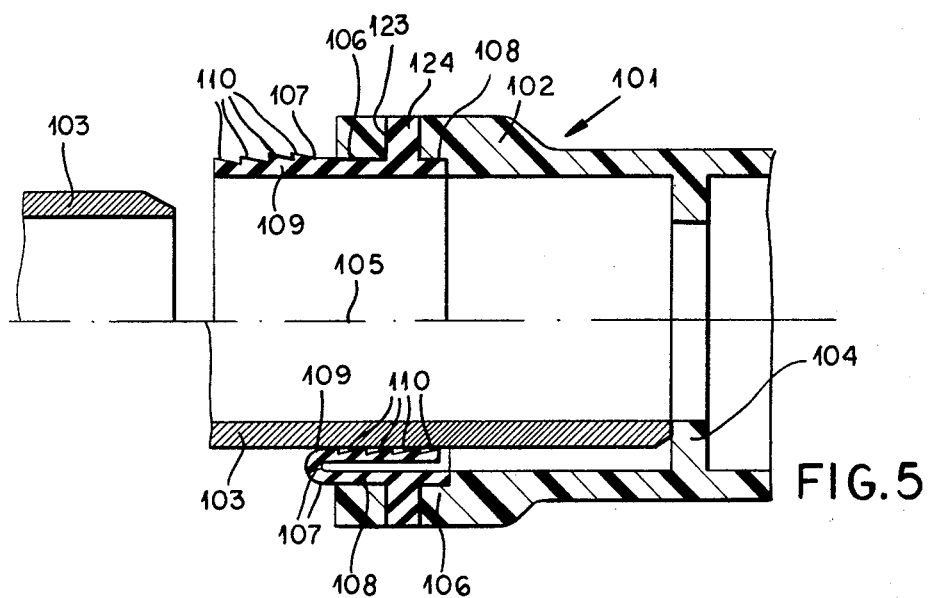
FIG. 5 is an axial section through another pipe joint according to this invention.

FIG. 5 shows another joint assembly 101 according to the invention, here formed by a bell 102 and a spigot 103. The pipe has an abutment 104 and the structure is mainly centered on an axis 105. In this arrangement the bell 102 is formed with a single radially inwardly and axially outwardly open groove 106 for a seal ring 107 which in use is of U-section and has an outer leg 108 and an inner leg 109. The leg 109 is formed with sawtooth ridges 110 that have their short flank axially inward of their long flank in the use position.

This arrangement is made by a multipart mold having an outer part 112 and an inner part 113. The outer part 112 is centered on the axis 105 and has an inner surface 114 that is complementary to the outer surface of the bell 102, having an end face 114' that eliminates the necessity for a part such as shown at 28 in FIGS. 2–4. This outer part is also formed with a fill hole 121 at the level where the abutment 104 is formed, much like the fill opening 21 of FIGS. 2–4.

The inner mold part 13 comprises a first central part 119, a second central part 117, and an outer sleeve part 118. In addition the mold includes a plurality of angularly equispaced and radially displaceable pins 122 functionally identical to the pins 22 of FIGS. 2-4. The central parts 116 and 117 separate at the level of the abutment 104 in the same manner as described in FIGS. 2-4. The outer surface 116' of the central part 119 is cylindrical and of the diameter D so as to form the cylindrical inner surface of the pipe. The portion 118 has a cylindrical outer surface 116" which is complementary to the groove 106.

Figure 6:
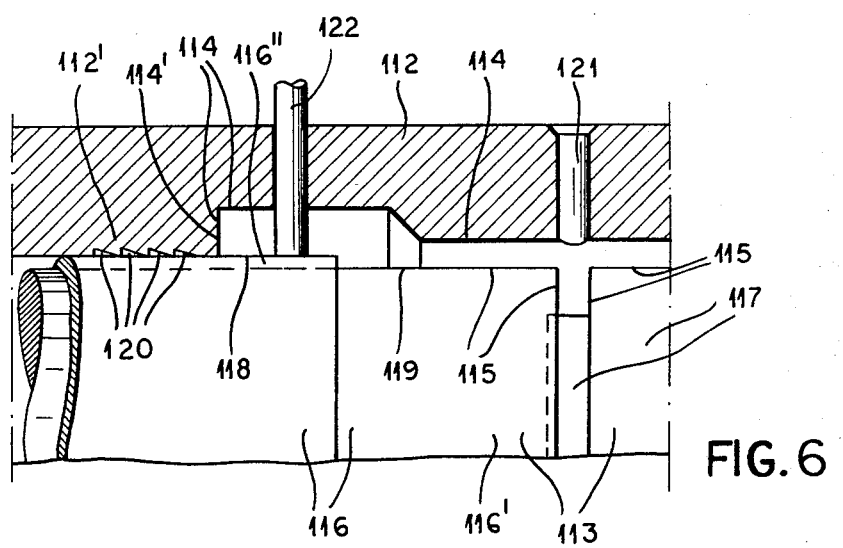
FIG. 6 is an axial section illustrating a first production stage for the pipe joint of FIG. 5.
Figure 7:
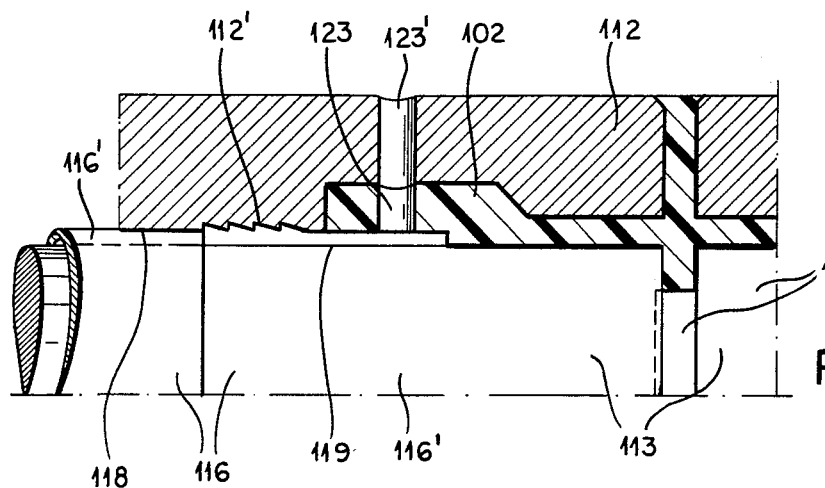
FIG. 7 is a section similar to that of FIG. 6 showing the following production stage.

At the start of the operation the various parts are positioned as shown in FIG. 6, that is with the two parts 119 and 117 engaged, the part 118 axially inwardly extended, and the pins 122 advanced radially inwardly into contact with the surface 116". A hardenable synthetic resin such as polyvinyl chloride is injected through the holes 121 to form the pipe indicated in FIG. 7.

Thereupon the pins 122 are withdrawn to form holes 123 in the bell 102 and align passages 123' and the mold part 112. This mold part 112 is formed axially outwardly from the surface 114' with sawtooth grooves 120 complementary to the ridges 110 to be formed on the seal ring 107. The element 118 is then withdrawn to the end of the area with the grooves 112' and resin is injected through the passages 123' and 123 into the space thus formed.

Figure 8:
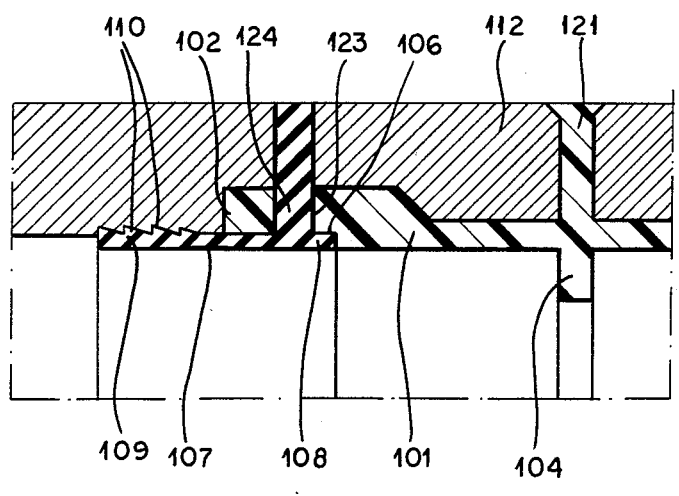
FIG. 8 is a section similar to that of FIG. 6 showing the last production stage.

The result as shown in FIG. 8 is a seal ring 107 which is of cylindrical shape and which has one of its legs extending outwardly out of the bell 102. Sprues 124 are formed extending through the holes 123 and 123'. Once again fusing or at least very good adherence can be ensured at the interface between the leg 108 of the seal ring 107 and the bell 102.

In use the leg 109 is folded back inside the leg 108 to engage the spigot 103 as shown in FIG. 5. The sawtooth formations prevent outward displacement of the spigot 103 while forming a very tight seal therewith.

Figure 9:
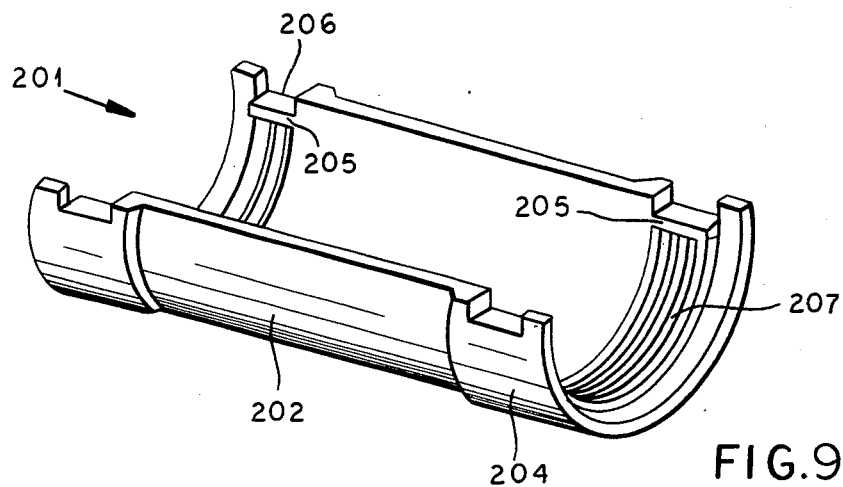
FIG. 9 is a perspective view of another joint assembly according to this invention.
Figure 10:
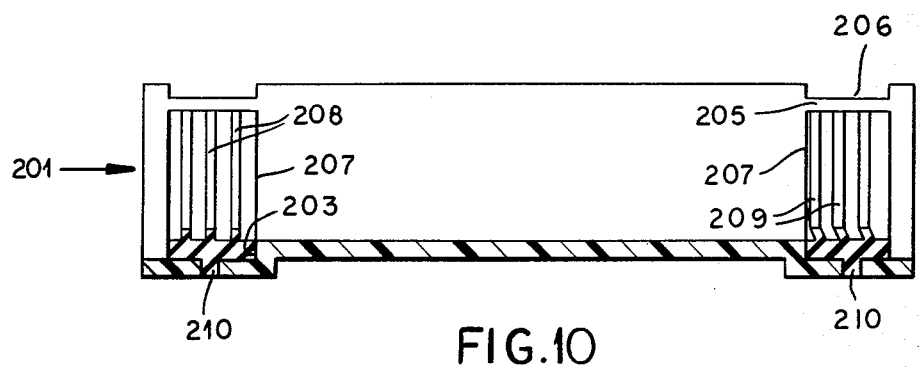
FIG. 10 is an axial section through the assembly of FIG. 9.
Figure 11:
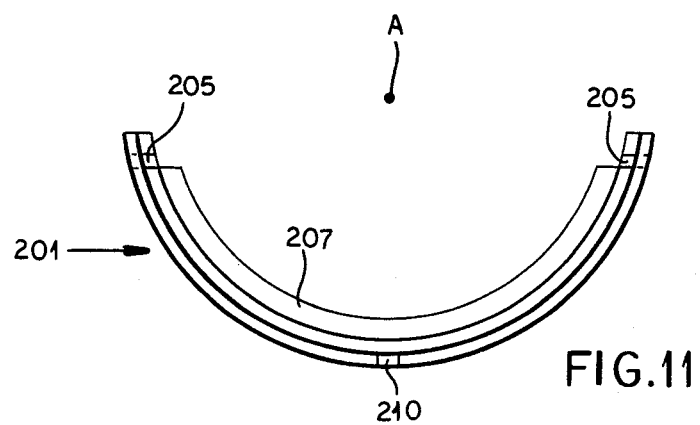
FIG. 11 is an end view of the assembly of FIG. 9.

FIGS. 9, 10 and 11 show a channel coupling 201 of slightly less than semicylindrical tubular shape and centered on an axis A. This coupling 201 has a straight central section 202 stepped down at 203 to two recessed end sections 204. Ridges 205 from axial extensions of the central section 202 and the longitudinal edges of the coupling 201 are formed with notches 206 that serve for seating clamps that hold the coupling 201 between two pieces of channel as in a gutter system.

Molded at each of the shouders or steps 203 is a seal 207. The left-hand seal 207, as seen in FIG. 10, is formed with four short ridges 208 and the right-hand seal 207 with three sawtooth ridges 209. Sprue holes 210 contain sprues from these seals 207.

Thus FIGS. 9-11 show that the instant invention can also be applied to nontubular members. It is possible to provide a seal on the concave inside surface of virtually any construction element with the method according to the instant invention. The provision of a sprue extending completely through the outer part, as compared to simply having a finger of the seal engaged in a hole in the outer part, ensures that an extremely good hold will be obtained. In addition the mold parts that make the assembly according to the instant invention can be pulled apart without damaging the soft elastomeric seal before same cures.

I claim:

1. A joint assembly comprising:
a hard outer member having a concave inner surface and formed on said inner surface with a recess, said outer member being formed as a substantially semi-cylindrical channel with a throughgoing sprue hole opening on said inner surface at said recess; and
a soft generally semi-cylindrical shaped seal adhered to said inner surface at said recess and having an integral sprue extending all the way through said outer member at said sprue hole, said channel is centered on an axis and has a pair of axially opposite ends, said channel being formed with a radial step adjacent one of said ends forming said recess, said seal having a plurality of axially spaced inwardly extending ridges.

2. A joint assembly comprising:
a hard outer member having a cylindrical inner surface and a mouth at one end and formed on said inner surface adjacent said mouth of said member with a cylindrical recess having two portions of different diameter, said outer member being formed with a through going sprue hole opening on said inner surface at said recess, said outer member being further formed axially inwardly of said recess from said mouth with an inwardly extending annular shoulder between said portions of different diameter; and
a soft seal adhered to said inner surface at said recess and having an integral sprue extending all the way through said outer member at said sprue hole, said soft seal having a V-cross section with a shank lying in one portion of said recess flush with said inner surface and a pair of arms reaching toward said mouth, one of said arms lying against a wall of the other portion of said recess and having an inwardly converging bevel at said mouth and the other of said arms being spaced from said one of said arms and tapering in cross section toward said mouth.

* * * * *